United States Patent Office.

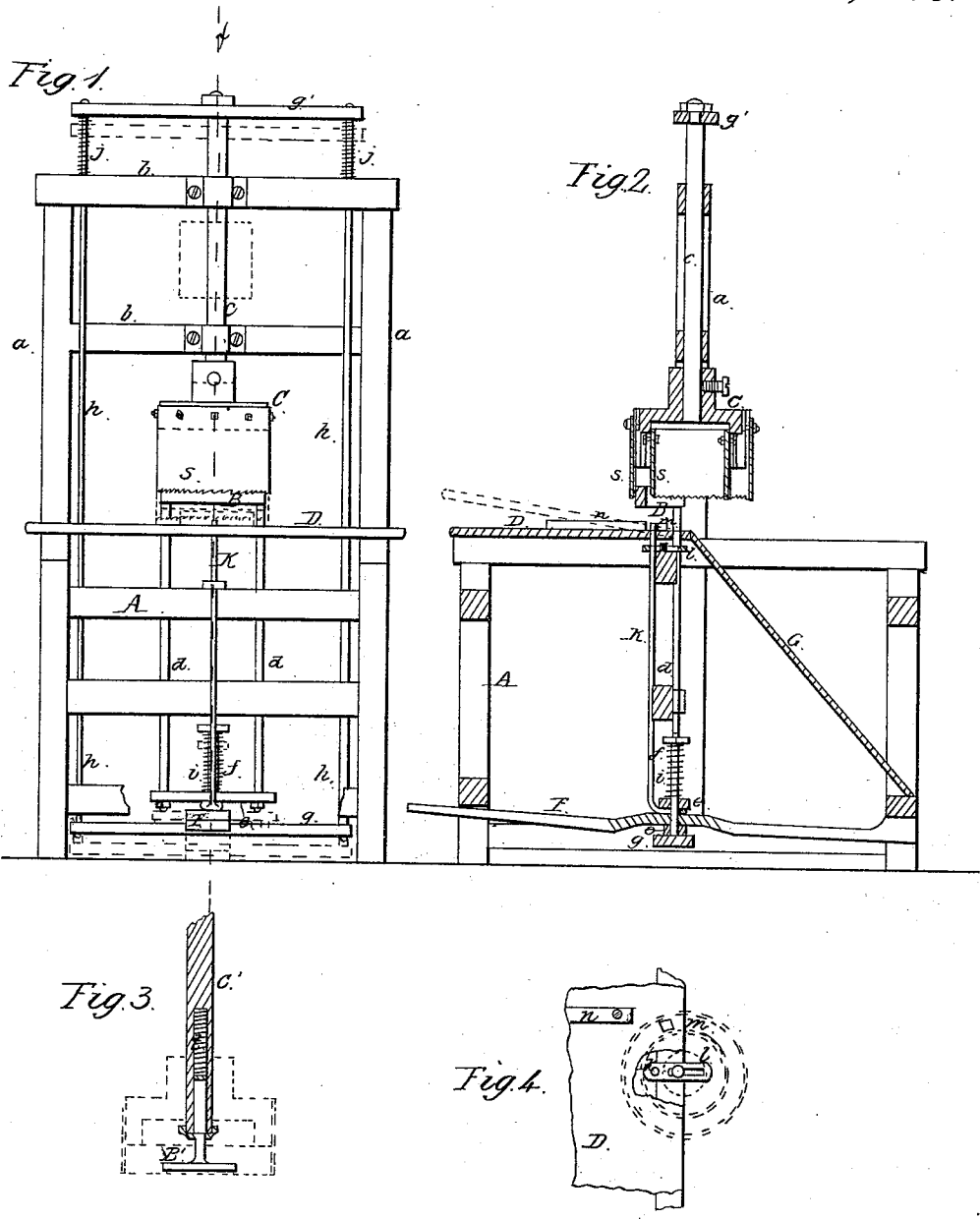

JAMES CHASE, OF ROCHESTER, NEW YORK.

Letters Patent No. 103,843, dated June 7, 1870; antedated May 23, 1870.

IMPROVEMENT IN SAWING-MACHINE.

The Schedule referred to in these Letters Patent and making part of the same

*To all whom it may concern:*

Be it known that I, JAMES CHASE, of Rochester, in the county of Monroe and State of New York, have invented certain new and useful Improvements in Circular "Sawing-Machines;" and I do hereby declare that the following is a full, clear, and exact description thereof, reference being had to the accompanying drawing making part this specification, in which—

Figure 1 is a front elevation of my invention.
Figure 2 is a vertical central section through the dotted line $x$, fig. 1.
Figure 3 is a section of another form of clamp, B.
Figure 4 is a plan view of a portion of the table.

The main object of my invention is to provide a machine by which many articles of circular form, such as fellys of small wheels, chair-backs, and other parts of cabinet-work, of segmental shape, may be cheaply and expeditiously sawed out.

To enable others to make and use my invention, I will describe its construction and operation.

Upon the frame A, made of suitable size and shape, I erect two posts, $a$, connected together by cross-girts $b$.

The saw mandrel $c$ runs in boxes secured to these girts, and carries at its lower end the drum saw-head C, while the upper end extends some distance above the post $a$.

This mandrel is driven by a belt upon a long-faced pulley fixed to it, and is free to move vertically in its boxes, being suspended upon the cross-head $g'$, as hereinafter explained.

The saw-head C is provided with two drum-saws $s$, of different diameters, the inside diameter of the outer one and the outside diameter of the inner one determining the size of the work. These saws may be secured to the head by bolts passing through them near the upper edge, and sliding in slots formed in the flanges of the head, as shown in fig. 2.

By this means the saws need be pierced with only one set of bolt-holes, any required vertical adjustment being made upon the head.

The block to be sawed rests upon the table D, and is held during the operation by the circular clamp B, secured, at its extremities, to the vertical rods $d$, figs. 1 and 2, which rods extend below the table D, and are attached to the cross-head $e$.

This cross-head rests upon the foot-lever F, projecting out in front of the frame A a suitable distance, and having a pivoting point at the rear, as shown in fig. 2.

The bolt $f$ passes loosely through the cross-head $e$ and foot-lever F, and a nut, $o$, fig. 2, is screwed upon it near its lower end, upon which the foot-lever rests.

Between the head of this bolt and the cross-head $e$ I provide the spring $i$, the tension of which is adjusted by screwing the bolt through the nut $o$.

The long cross-head $g$, to which is attached the corresponding cross-head $g'$, by means of the tie-rod $h$, supports the foot-lever F, cross-head $e$, and clamp B, while the cross-head $g'$ supports the mandrel $c$ by means of a nut screwed upon its end.

The mandrel is prevented from "end chase" by a shoulder or collar under the cross-head.

The springs $j$, between the latter and the frame of the machine, support the saw-mandrel, cross-heads, and connected parts.

It is obvious that the arrangement of the spring $i$ upon the bolt $f$ renders the clamp B and saw-head C partially independent of each other in their vertical adjustment, since, when the clamp comes in contact with the block underneath it, the pressure upon the foot-lever still causes the saws to descend by compressing the spring, as shown in dotted lines in fig. 1. The pressure of the clamp upon the work is thus increased as the saws descend, whereby it is held perfectly firm for any depth or speed of cut.

To regulate the forward feed of the block, I provide a stop-gauge, $k$, figs. 1, 2, and 4, suitably attached to the foot-lever, and extending a short distance above the table D.

The horizontally adjusting plate $l$, fig. 4, guides the gauge and retains it at the desired "set." The stop-gauge is thus alternately moved out of the way and returned again at each movement of the foot-lever.

A stop, $m$, figs. 2 and 4, is also provided upon the table, either fixed or adjustable, at a point between the tracks of the saws $s$, to prevent the sawed piece from being whirled off by the motion of the latter.

An adjustable guide, $n$, may also be employed, against which one edge of the board or block may be placed.

The operation of my invention is as follows:

The block to be sawed is placed against the guide $n$ and pushed forward till it meets the stop-gauge $k$, when, by a downward movement of the foot-lever, the saws $s$ and clamp B are forced down till the latter rests upon the block and binds it to the table.

A continued motion of the foot-lever causes the spring $i$ to yield, and forces the saws to pass by the clamp into and through the block.

The pressure is now partially removed from the foot-lever till, by the action of the springs $j$, the end of the gauge $k$ rises nearly to the upper face of the table D, when the sawed piece—which has been firmly held by the clamp B and stop $m$—may be pushed from under the saws down the inclined board G to the rear of the machine. The pressure is now entirely removed from the foot-lever, when the springs $j$ return the saws, clamp, stop-gauge, and connected parts, to their former position, ready for another similar operation.

My invention is also adapted to preparing wholly or partially circular pieces, for such purposes as bottoms of measures, fruit and sugar boxes, and similar articles. In such cases I employ a clamping device shown in fig. 3.

The spindle of the clamp B' slides in the hollow saw-mandrel $c'$, and is forced upon the work by the spring $t$ above it. The clamp is sustained by a nut screwed upon the end of the mandrel, against which nut a shoulder upon the spindle rests. The clamp may be circular and provided with points to enter the work. The operation is similar to the clamp B.

For sawing beveled circular work, such as chair-backs, the table D may be hinged at the line of the center of the saw-mandrel, and adjusted at any angle, by a suitable device, as shown by dotted lines in fig. 2.

It will observed that, by the use of this machine, I am enabled to execute work of a circular form with much greater speed than is possible by the old method of marking out by patterns, and sawing with jig or band-saws, since the whole operation may be performed in less time than the pieces can be marked out. The work is also better done, requiring less labor in finishing, and occasioning less waste of material than the hand process.

The saw-heads C may be easily changed, when necessary, for those of different diameters. The frame A may, if desirable, be constructed of iron, in a convenient and desirable form.

What I claim as my invention, and desire to secure by Letters Patent, is—

1. The circular yielding clamp B, when operated conjointly with the saw-head C, for the purposes set forth.

2. The adjustable spring $i$, in combination with the foot-lever F and clamp B, when constructed to operate substantially as described.

3. The arrangement of the vertically moving saw-head C, side-rods $h$, springs $j$, foot-lever F, clamp B, and spring $i$, operating substantially in the manner and for the purposes herein set forth.

4. The arrangement of the adjustable stop-gauge $k$, constructed substantially as described, and the clamp B, and head C, for the purposes set forth.

JAMES CHASE.

Witnesses:
 F. H. CLEMENT,
 A. H. BILLINGS.